(12) United States Patent
Brandl et al.

(10) Patent No.: US 8,519,580 B2
(45) Date of Patent: Aug. 27, 2013

(54) ELECTRIC MACHINE WITH A HIGH PROTECTION CLASS WITH IMPROVED ROTOR COOLING

(75) Inventors: Konrad Brandl, Thalmassing (DE); Reiner Grillenberger, Windsbach (DE); Sebastian Weiss, Oberasbach (DE); Ilkka Af Ursin, Turku (FI)

(73) Assignee: Siemens Aktiengesellschaft, München (DE)

( * ) Notice: Subject to any disclaimer, the term of this patent is extended or adjusted under 35 U.S.C. 154(b) by 119 days.

(21) Appl. No.: 13/057,061

(22) PCT Filed: Jul. 14, 2009

(86) PCT No.: PCT/EP2009/058982
§ 371 (c)(1),
(2), (4) Date: Feb. 1, 2011

(87) PCT Pub. No.: WO2010/012585
PCT Pub. Date: Feb. 4, 2010

(65) Prior Publication Data
US 2011/0140550 A1   Jun. 16, 2011

(30) Foreign Application Priority Data
Aug. 1, 2008  (DE) .................. 10 2008 036 124

(51) Int. Cl.
*H02K 9/08* (2006.01)
(52) U.S. Cl.
USPC .................................. 310/57; 310/58; 310/59
(58) Field of Classification Search
USPC .................... 310/52, 53, 58–59, 64, 60 A, 61
See application file for complete search history.

(56) References Cited

U.S. PATENT DOCUMENTS

| | | | |
|---|---|---|---|
| 3,675,056 A * | 7/1972 | Lenz .............................. | 310/54 |
| 4,406,959 A * | 9/1983 | Harano et al. .................. | 310/58 |
| 7,411,323 B2 * | 8/2008 | Pfannschmidt et al. ........ | 310/58 |
| 2004/0150270 A1 | 8/2004 | Nagayama et al. | |
| 2006/0226717 A1 | 10/2006 | Nagayama et al. | |

FOREIGN PATENT DOCUMENTS

| | | |
|---|---|---|
| CN | 1784818 A | 6/2006 |
| DE | 39 25 337 A1 | 2/1991 |
| DE | 91 12 631 U1 | 2/1993 |
| DE | 44 43 427 A1 | 6/1996 |
| DE | 196 06 146 A1 | 8/1997 |
| DE | 102 47 310 A1 | 4/2004 |
| DE | 10 2006 006 839 A1 | 8/2007 |

(Continued)

*Primary Examiner* — Tran Nguyen
*Assistant Examiner* — Leda Pham
(74) *Attorney, Agent, or Firm* — Henry M. Feiereisen LLC

(57) ABSTRACT

An electric machine has a stator and a rotor arranged on a rotor shaft for rotation about a shaft axis, wherein the shaft axis defines an axial, a radial and a tangential direction. The rotor has at least one continuous axial rotor channel. The stator has a lamination stack extending over the rotor viewed in the axial direction. The lamination stack completely surrounds the rotor, forming a closed inner rotor chamber and has at least one axial stator channel running continuously in the axial direction and that is completely closed when viewed on the sectional plane. The electric machine has covers which are designed to form in conjunction with the lamination stack at least one radial channel running in the radial direction. The radial channels connect the axial stator channel(s) to the inner rotor chamber by means of a fluid connection but are otherwise closed.

9 Claims, 5 Drawing Sheets

(56) References Cited

FOREIGN PATENT DOCUMENTS

| EP | 0915554 | A2 | 5/1999 |
|---|---|---|---|
| RU | 2101836 | C1 | 1/1998 |
| SU | 535671 | A1 | 11/1976 |
| SU | 1224903 | A1 | 4/1985 |
| SU | 1185497 | A1 | 10/1985 |
| SU | 1806436 | A3 | 3/1993 |

* cited by examiner

ELECTRIC MACHINE WITH A HIGH PROTECTION CLASS WITH IMPROVED ROTOR COOLING

CROSS-REFERENCES TO RELATED APPLICATIONS

This application is the U.S. National Stage of International Application No. PCT/EP2009/058982, filed Jul. 14, 2009, which designated the United States and has been published as International Publication No. WO 2010/012585 and which claims the priority of German Patent Application, Serial No. 10 2008 036 124.0, filed Aug. 1, 2008, pursuant to 35 U.S.C. 119(a)-(d).

BACKGROUND OF THE INVENTION

The present invention relates to an electric machine
wherein the electric machine has a stator and a rotor shaft,
wherein the rotor shaft is mounted in such a way that it can rotate relative to the stator about a shaft axis, with the result that the shaft axis defines an axial direction, a radial direction and a tangential direction,
wherein a rotor, which interacts electrically with the stator, is arranged on the rotor shaft,
wherein the rotor has at least one axially continuous rotor axial channel,
wherein the stator has a stator laminate stack, which extends over the rotor, when viewed in the axial direction,
wherein the stator laminate stack completely surrounds the rotor, when viewed in a sectional plane orthogonal to the axial direction, with the result that a closed rotor interior is formed, when viewed in the sectional plane,
wherein in each case one cover is positioned axially on both sides on the stator laminate stack,
wherein at least one of the covers has a central cutout through which the rotor shaft passes,
wherein the stator laminate stack has at least one stator axial channel, which is continuous when viewed in the axial direction and is completely closed when viewed in the sectional plane.

Such electric machines are provided with protection class IP 55, inter alia. In this configuration, the electric machines generally do not have a housing.

In the prior art, a coolant, usually air, flows through the stator axial channels. The stator is cooled by means of the coolant.

However, excess heat is produced not only in the stator, but also in the rotor. In the prior art, it is not possible to cool the rotor directly. The excess heat produced in the rotor therefore needs to be dissipated via the air gap between the stator and the rotor and the stator geometry. As a result, the excess heat produced in the rotor can therefore only be dissipated to a limited extent. Owing to this circumstance, the electric machine can only be operated at a considerably reduced machine performance in comparison with a comparable electric machine in which the rotor is cooled directly. The reduction in the machine performance is up to 60%.

In the prior art, the poor cooling is often accepted since no solution is known for providing improved cooling of the rotor in a simple manner without needing to give up the high IP55 protection class.

SUMMARY OF THE INVENTION

The object of the present invention resides in the configuration of an electric machine of the type mentioned at the outset in such a way that the rotor can be cooled more effectively in a simple manner.

The object is achieved in accordance with the invention by an electric machine having a stator and a rotor shaft,
wherein the rotor shaft is mounted in such a way that it can rotate relative to the stator about a shaft axis, with the result that the shaft axis defines an axial direction, a radial direction and a tangential direction,
wherein a rotor, which interacts electrically with the stator, is arranged on the rotor shaft,
wherein the rotor has at least one axially continuous rotor axial channel,
wherein the stator has a stator laminate stack, which extends over the rotor, when viewed in the axial direction,
wherein the stator laminate stack completely surrounds the rotor, when viewed in a sectional plane orthogonal to the axial direction, with the result that a closed rotor interior is formed, when viewed in the sectional plane,
wherein in each case one cover is positioned axially on both sides on the stator laminate stack,
wherein at least one of the covers has a central cutout through which the rotor shaft passes,
wherein the stator laminate stack has at least one stator axial channel, which is continuous when viewed in the axial direction and is completely closed when viewed in the sectional plane,
wherein the covers are designed in such a way that, in interaction with the stator laminate stack, they form in each case at least one radial channel running in the radial direction,
wherein the radial channels connect the at least one stator axial channel in terms of flow to the rotor interior, but are otherwise closed, and
wherein in order to necessarily induce forced convection, at least one element acting as a fan is arranged on the rotor shaft axially within the covers.

As a minimum it may be sufficient in a specific case for a single stator axial channel to be provided. In general, however, a plurality of stator axial channels are provided. In particular, in the conventional case in which the stator laminate stack has a square outer contour, when viewed in the sectional plane, in each case at least one stator axial channel can be arranged in the vicinity of each corner of the square outer contour. In this case, the stator axial channels can be arranged in particular on the diagonals of the square outer contour.

Often, the stator laminate stack has further stator axial channels, which are continuous when viewed in the axial direction and are separated in terms of flow from the rotor interior. These stator axial channels, if provided, can be used for cooling the stator laminate stack with external air (or another coolant, for example water). Forced convection is possible, but not essential.

If the further stator axial channels are provided, they are preferably not arranged directly on the diagonals of the square outer contour.

In general, the covers and the stator laminate stack encapsulate the rotor interior with protection class IP55 or higher. In individual cases, however, a lower protection class is also possible.

It is possible for the rotor shaft to be mounted independently of the covers. Preferably, however, the rotor shaft is mounted in the covers.

The rotor can be designed as required. For example, the rotor can have a rotor laminate stack, which for its part bears a rotor winding or permanent magnets.

Preferably, the element acting as a fan is connected by material joint to the rotor shaft or the rotor. As a result, a particularly stable connection which is reliable during continuous operation can be achieved. For example, the element can be cast on the rotor.

BRIEF DESCRIPTION OF THE DRAWING

Further advantages and details are given in the description below relating to exemplary embodiments in conjunction with the drawings, in which, in the form of a basic illustration.

DETAILED DESCRIPTION OF PREFERRED EMBODIMENTS

Figure 1:
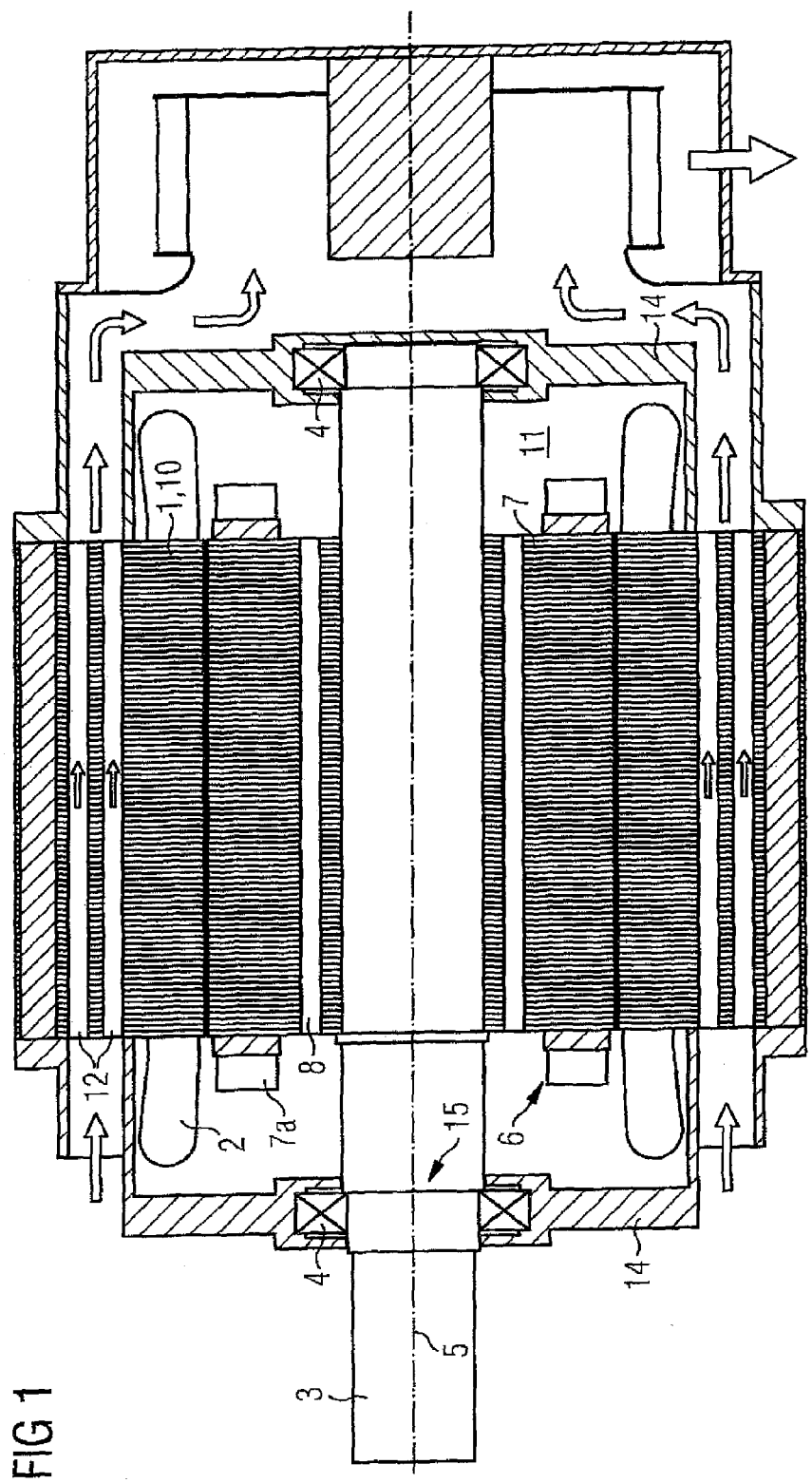
FIG. 1 shows an electric machine of the prior art in longitudinal section.
Figure 2:
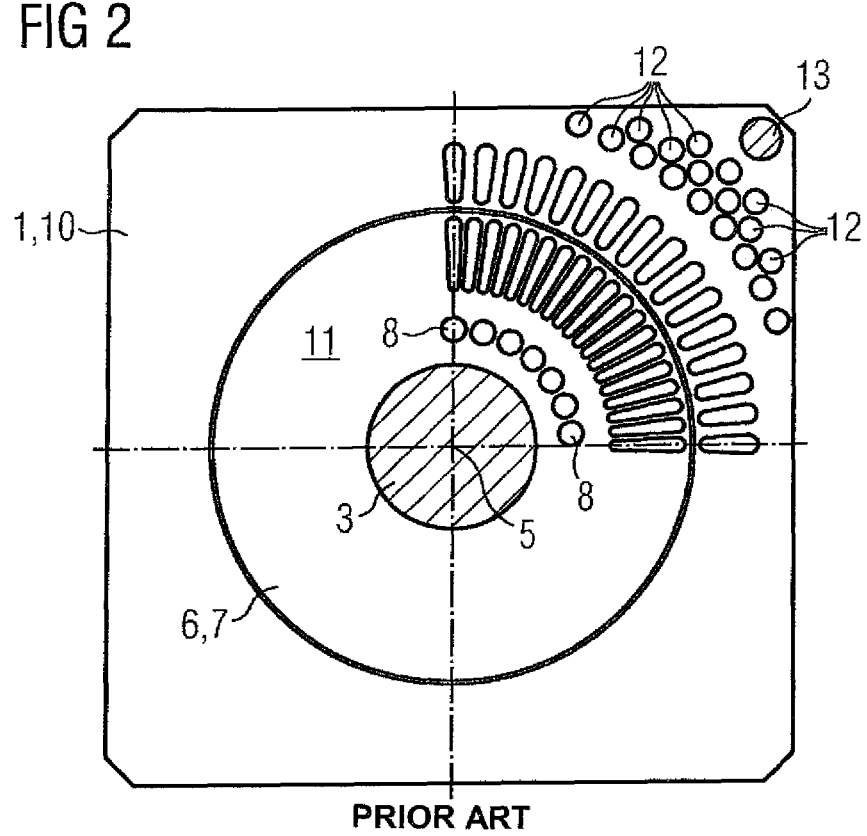
FIG. 2 shows a cross section through the electric machine shown in FIG. 1 along a line II-II in FIG. 1.

As shown in FIGS. 1 and 2, an electric machine has a stator 1. The stator 1 bears a stator winding 2.

The electric machine furthermore has a rotor shaft 3. The rotor shaft 3 is mounted in shaft bearings 4. Owing to the fact that it is mounted in the shaft bearings 4, the rotor shaft 3 is capable of rotating relative to the stator 1 about a shaft axis 5.

The shaft axis 5 defines an axial direction, a radial direction and a tangential direction. The term "axial" in this case means a direction parallel to the shaft axis 5. The term "radial" means a direction orthogonal to the axial direction, to be precise towards the shaft axis 5 or away from the shaft axis 5. The term "tangential" denotes a direction orthogonal to the axial direction and orthogonal to the radial direction, i.e. at a radial distance from the shaft axis 5 about the shaft axis 5.

A rotor 6 is arranged on the rotor shaft 3. The rotor 6 interacts electrically with the stator 1. For example, the rotor 6 can have a rotor laminate stack 7, which for its part bears a rotor winding 7a or permanent magnets. The permanent magnets are not illustrated in FIGS. 1 and 2.

The rotor 6 has at least one rotor axial channel 8. In this case, the rotor axial channel 8 is axially continuous. As shown in FIG. 2, even a plurality of such rotor axial channels 8 are provided. The number of rotor axial channels 8 can be selected as required. For example, eight such rotor axial channels 8 can be provided.

The stator 1 has a stator laminate stack 10. The stator laminate stack 10 extends over the entire rotor 6, i.e. in particular over the rotor laminate stack 7, when viewed in the axial direction. The individual stator laminates of the stator laminate stack 10 in this case generally have a square outer contour, when viewed in a sectional plane orthogonal to the axial direction (see FIG. 2). This configuration is conventional, but is not absolutely essential.

As shown in FIG. 2, the stator laminate stack 10 completely surrounds the rotor 6, when viewed in the sectional plane. When viewed in the sectional plane, a closed rotor interior 11 thus results.

The stator laminate stack 10 has a large number of stator axial channels 12. When viewed in the axial direction, the stator axial channels 12 are continuous. When viewed in the sectional plane, they are completely closed. During operation of the electric machine, a coolant, for example cooling air, flows through the stator axial channels 12, and said stator axial channels therefore cool the stator 1 of the electric machine.

Furthermore, the electric machine shown in FIGS. 1 and 2 has fastening cutouts 13 in the corners of the outer contour. The fastening cutouts 13 are used for receiving axial bolts, by means of which the individual laminates in the stator laminate stack 10 are connected to one another. The axial bolts are not illustrated in FIGS. 1 and 2.

As shown in FIG. 1, covers 14 are furthermore placed axially on both sides on the stator laminate stack 10. At least one of the covers 14 has a central cutout 15, with the result that the rotor shaft 3 can pass though the central cutout 15. The rotor interior 11 is hermetically encapsulated by means of the covers 14 and the stator laminate stack 10. In general, the encapsulation adheres to protection class IP55 or higher.

As shown in FIG. 1, the shaft bearings 4 in which the rotor shaft 3 is mounted are arranged in the covers 14. The rotor shaft 3 is therefore mounted in the covers 14. However, this configuration is not essential.

The electric machine according to the invention, which will be explained below in conjunction with FIGS. 3 to 8, has from the beginning likewise been constructed as has been explained above for the electric machine from the prior art. The same reference symbols are therefore used below for the same elements in the electric machine according to the invention. The reference symbols 12' and 12" have merely been used for the stator axial channels instead of the reference symbol 12. In this case, the reference symbol 12' is used to denote first stator axial channels, and the reference symbol 12" is used to denote second stator axial channels. The reason for this difference is apparent from the statements below.

As shown in FIGS. 3 to 8, the covers 14 are designed such that, in interaction with the stator laminate stack 10, they each form at least one radial channel 16, which runs in the radial direction. In the conventional case in which the stator laminate stack 10 has a square outer contour, when viewed in the sectional plane, in each case one radial channel 16 preferably runs in the direction of each corner of the square outer contour. The radial channels 16 connect the first stator axial channels 12' in terms of flow to the rotor interior 11. In the case of the square outer contour of the stator laminate stack 10, in which the radial channels 16 run in the direction of the diagonals of the square outer contour, correspondingly the first stator axial channels 12' are preferably arranged in the vicinity of the corners of the square outer contour, to be precise preferably on the diagonals of the square outer contour.

Each radial channel 16 connects at least one of the first stator axial channels 12' in terms of flow to the rotor interior 11. As shown in FIGS. 5 to 9, even three such stator axial channels 12' are covered by each radial channel 16. The covered stator axial channels 12' are in this case arranged one behind the other, when viewed in the radial direction.

The protection class in which the covers 14 encapsulate the rotor interior 11 should be adhered to. The radial channels 16 therefore connect the first stator axial channels 12' in terms of flow to the rotor interior 11, but are otherwise closed.

Owing to the above-described configuration, a closed air circuit is possible, which passes first axially through the rotor axial channels 8, then radially outwards through the radial channels 16 of one cover 14, then axially through the first stator axial channels 12' and finally radially inwards through the radial channels 16 of the other cover 14. In order to force this air circuit, i.e. to bring about forced convection, at least one element 17 acting as a fan is arranged on the rotor shaft 3 axially within the covers 14. In exceptional cases, such elements 17 can be arranged axially on both sides of the rotor laminate stack 7. The element 17 or the elements 17 can in this case be connected by material joint in particular to the rotor shaft 3. For example, the element 17 or the elements 17 can be cast on the rotor 6.

During operation of the electric machine, i.e. during rotation of the rotor shaft 3 about its shaft axis 5, the above-explained convection is brought about as a result of the presence of the element 17 or the elements 17. The corresponding air flow is indicated by dashed lines in FIG. 4.

Owing to the configuration according to the invention, the excess heat produced in the rotor 6 is dissipated onto the stator 1 in a considerably improved manner in comparison with the prior art. From said stator, said excess heat can be dissipated outwards relatively easily. Owing to the configuration according to the invention, an increase in performance of 15 to 20% is possible, for example, in comparison with a comparable electric machine from the prior art.

In the configuration according to the invention of the electric machine, the second stator axial channels 12" do not necessarily need to be provided. However, they may be provided. If they are provided, they are separated from the rotor interior 11 in terms of flow. As is apparent in particular from FIG. 8, the further stator axial channels 12" are preferably not arranged directly on the diagonals of the square outer contour, when viewed in the sectional plane.

Figure 8:
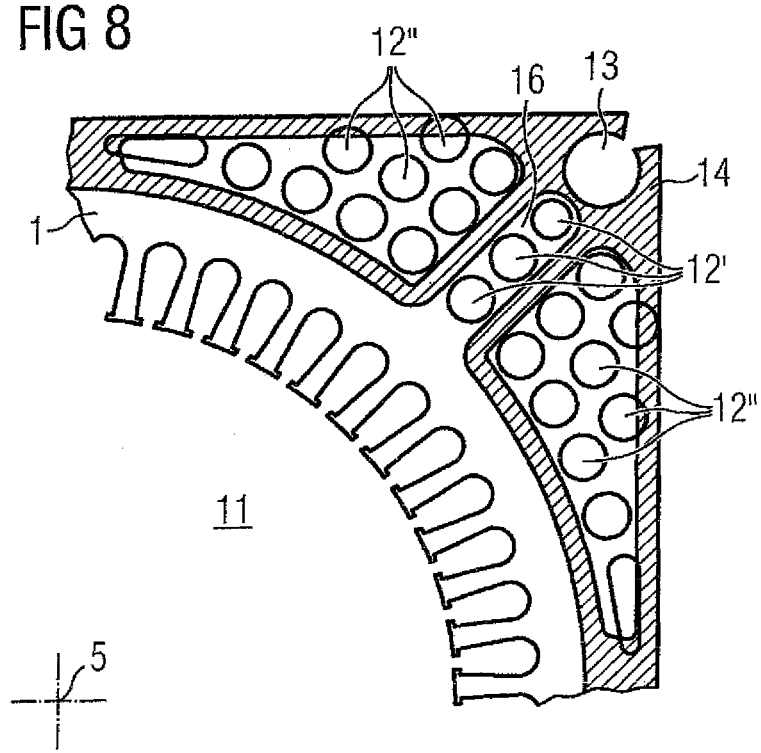
FIG. 8 shows a detail of FIG. 3 when viewed from a direction VIII-VIII in FIG. 3.
Figure 3:
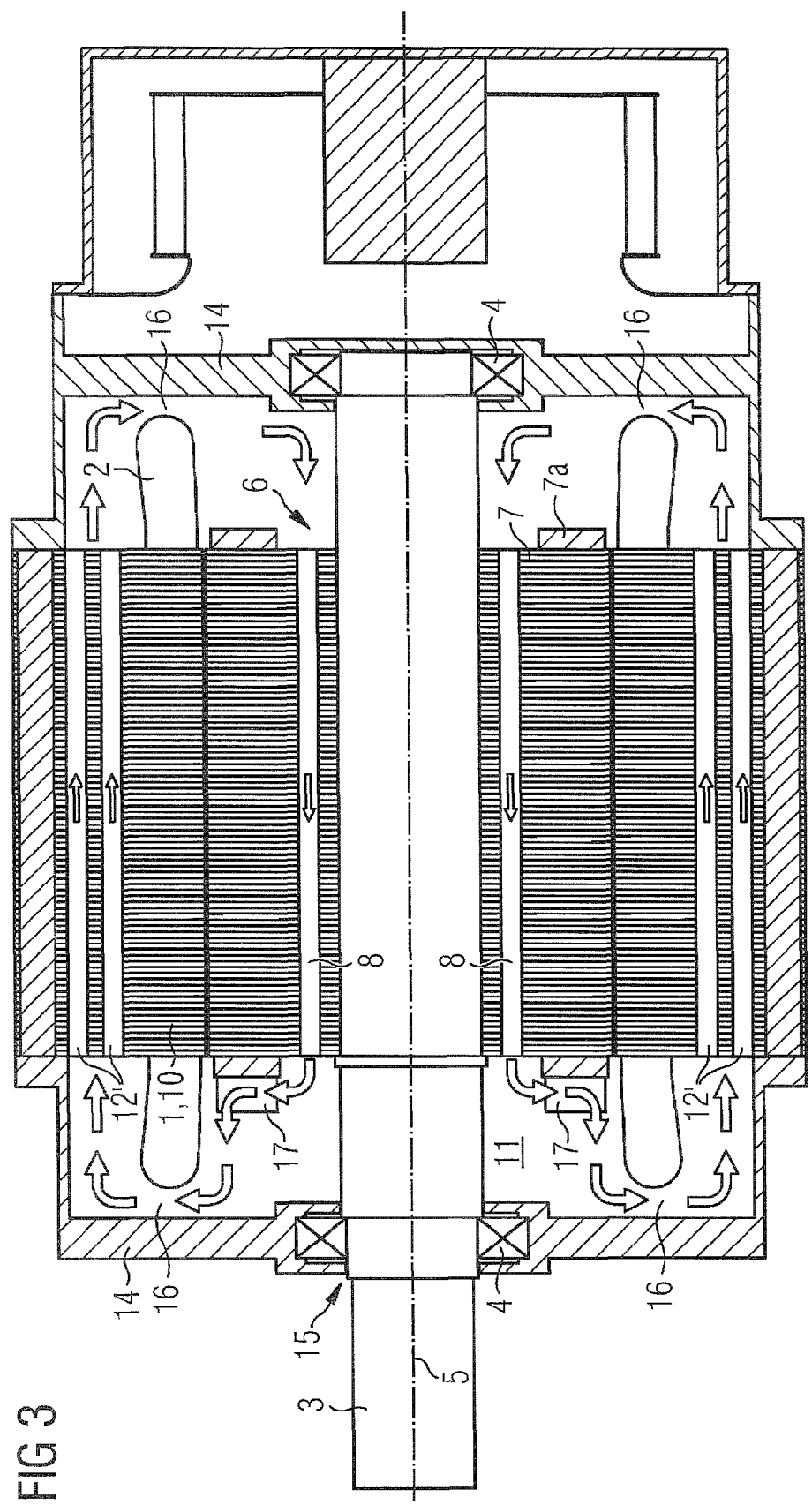
FIG. 3 shows an electric machine according to the invention in longitudinal section.
Figure 4:
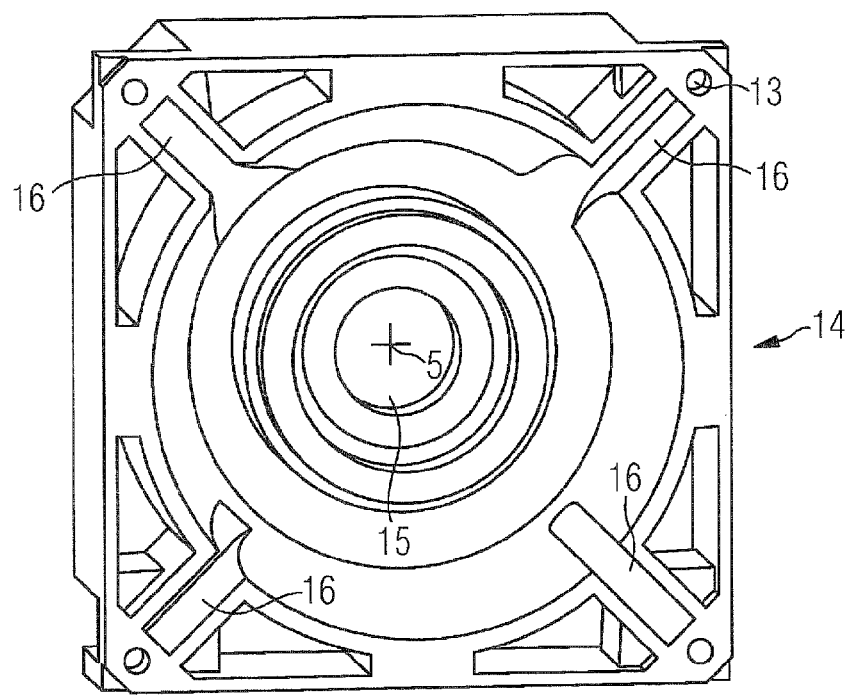
FIGS. 4 to 7 show different perspective illustrations of a cover for the electric machine shown in FIG. 3.
Figure 5:
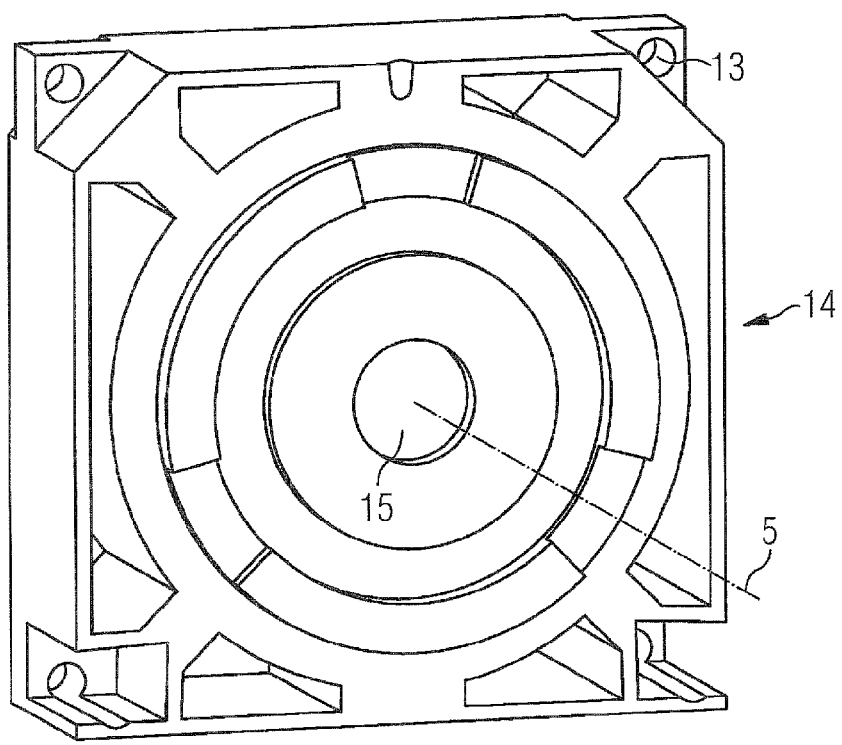
Figure 6:
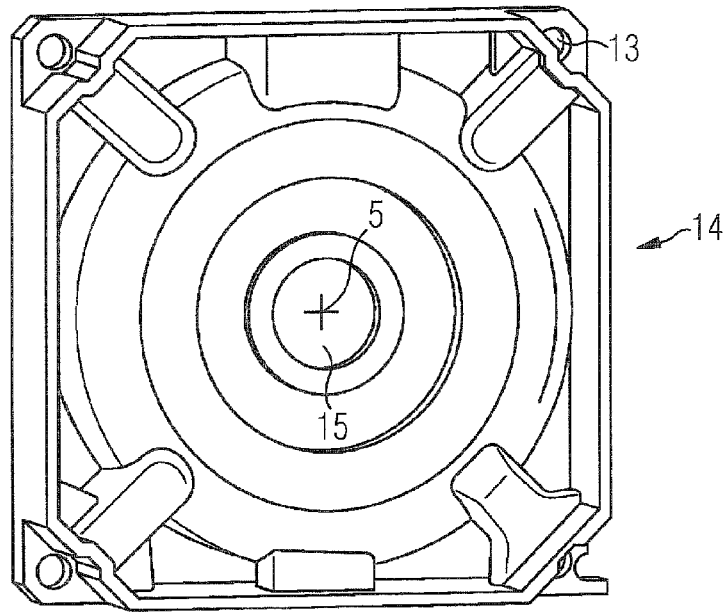
Figure 7:
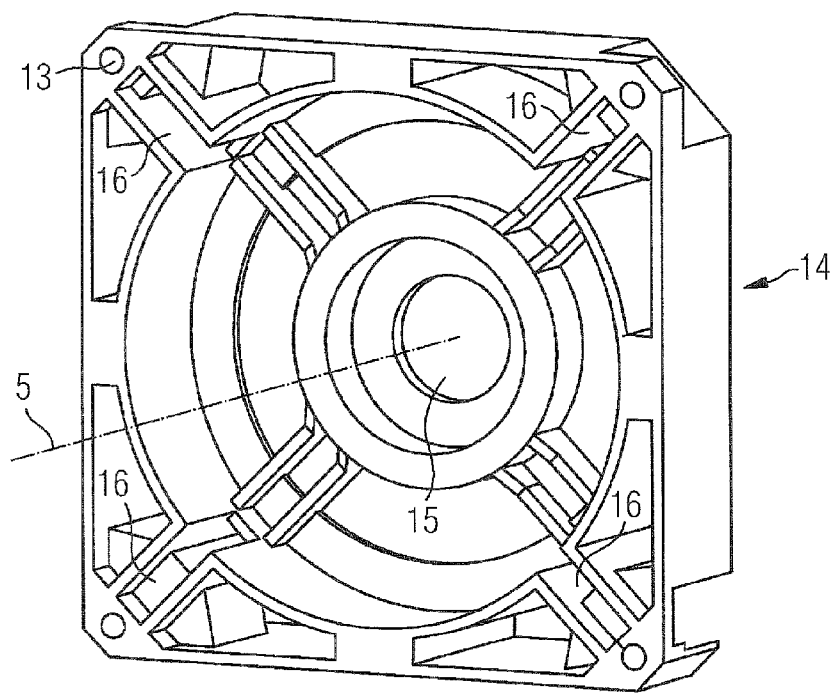

As shown in FIG. 8, the first stator axial channels 12' are arranged one behind the other, when viewed in the radial direction. In comparison, the stator axial channels 12 in the electric machine from the prior art (see FIG. 2) are arranged in a plurality of concentric rings, with the stator axial channels 12 being positioned with gaps with respect to one another ring to ring. However, this is not essential to the invention.

The above description is used exclusively for explaining the present invention. The scope of protection of the present invention is determined exclusively by the attached claims, however.

The invention claimed is:

1. An electric machine, comprising:
a stator including a stator laminate stack and having at least one first stator axial channel which is continuous when viewed in the axial direction and is completely closed when viewed in a sectional plane; and
a rotor shaft mounted relative to the stator for rotation about a shaft axis which defines an axial direction, a radial direction and a tangential direction,
a rotor arranged on the rotor shaft and interacting electrically with the stator, said rotor having at least one axially continuous rotor axial channel, wherein the stator laminate stack extends over the rotor, when viewed in the axial direction and completely surrounds the rotor, when viewed in the sectional plane orthogonal to the axial direction to define a closed rotor interior, when viewed in the sectional plane,
covers respectively positioned axially on both sides on the stator laminate stack, at least one of the covers having a central cutout for passage of the rotor shaft, said covers being configured to form jointly with stator laminate stack radial channels respectively in the radial direction, said radial channels fluidly connecting the at least one first stator axial channel to the rotor interior, but being otherwise closed; and
at least one element acting as a fan arranged on the rotor shaft axially within the covers to realize a forced convection,
wherein the stator laminate stack has second stator axial channels which are continuous when viewed in the axial direction and fluidly separated from the rotor interior.

2. The electric machine claim 1, wherein the stator laminate stack has a square outer contour defining corners, when viewed in the sectional plane, further comprising a plurality of said first stator axial channel respectively arranged in a vicinity of the corners of the square outer contour.

3. The electric machine claim 2, wherein the first stator axial channels are arranged on diagonals of the square outer contour.

4. The electric machine claim 3, wherein the second stator axial channels are not arranged directly on the diagonals of the square outer contour, when viewed in the sectional plane.

5. The electric machine claim 1, wherein the covers and the stator laminate stack encapsulate the rotor interior with protection class IP55 or higher.

6. The electric machine claim 1, wherein the rotor shaft is mounted in the covers.

7. The electric machine claim 1, wherein the rotor has a rotor laminate stack to support a rotor winding or permanent magnets.

8. The electric machine claim 1, wherein the element acting as a fan is connected by a material joint with the rotor shaft or the rotor.

9. The electric machine claim 1, wherein the element acting as a fan is cast on the rotor.

* * * * *